US011351508B2

(12) United States Patent
Thalappil et al.

(10) Patent No.: US 11,351,508 B2
(45) Date of Patent: Jun. 7, 2022

(54) METHOD FOR CREATING NANOPORES IN $MOS_2$ NANOSHEETS BY CHEMICAL DRILLING FOR DISINFECTION OF WATER UNDER VISIBLE LIGHT

(71) Applicant: INDIAN INSTITUTE OF TECHNOLOGY MADRAS (IIT MADRAS), Chennai (IN)

(72) Inventors: Pradeep Thalappil, Chennai (IN); Depanjan Sarkar, Chennai (IN); Anirban Som, Chennai (IN); Biswajit Mondal, Chennai (IN); Swathy Jakka Ravindran, Chennai (IN)

(73) Assignee: INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 1 day.

(21) Appl. No.: 16/757,411

(22) PCT Filed: Oct. 18, 2018

(86) PCT No.: PCT/IN2018/050677
§ 371 (c)(1),
(2) Date: Apr. 19, 2020

(87) PCT Pub. No.: WO2019/077635
PCT Pub. Date: Apr. 25, 2019

(65) Prior Publication Data
US 2020/0330928 A1 Oct. 22, 2020

(30) Foreign Application Priority Data
Oct. 20, 2017 (IN) .............................. 201741037148

(51) Int. Cl.
*B01D 67/00* (2006.01)
*B01D 61/02* (2006.01)
(Continued)

(52) U.S. Cl.
CPC ......... *B01D 67/006* (2013.01); *B01D 61/027* (2013.01); *B01D 67/0069* (2013.01);
(Continued)

(58) Field of Classification Search
None
See application file for complete search history.

(56) References Cited

U.S. PATENT DOCUMENTS

| 2018/0265381 A1* | 9/2018 | Liu | C02F 1/46109 |
| 2019/0039028 A1* | 2/2019 | Wanunu | B01D 67/0041 |
| 2019/0177550 A1* | 6/2019 | Zhang | C09C 1/0003 |

FOREIGN PATENT DOCUMENTS

| CN | 104030360 A | 9/2014 |
| CN | 104925907 A | 9/2015 |

(Continued)

OTHER PUBLICATIONS

Mondal Biswajit et al. "Unusual reactivity of MoS2 nanosheets", Apr. 15, 2016.*

(Continued)

*Primary Examiner* — Roberts P Culbert
(74) *Attorney, Agent, or Firm* — Hauptman Ham, LLP

(57) ABSTRACT

The present invention relates to a new method for creating nanopores in single layer molybdenum disulfide ($MoS_2$) nanosheets (NSs) by the electrospray deposition (ESD) of silver ions on a water suspension of the former. Electrospray deposited silver ions react with the $MoS_2$ NSs at the liquid-air interface resulting in $Ag_2S$ nanoparticles (NPs) which goes into the solution leaving the NSs with holes of 3-5 nm diameter. Specific reaction with the S of $MoS_2$ NSs leads to Mo-rich edges. Such Mo-rich defects are highly efficient for the generation of active oxygen species such as $H_2O_2$, under visible light, which causes efficient disinfection of water. The holey $MoS_2$ NSs shows $10^5$ times higher efficiency in (Continued)

disinfection compared to normal $MoS_2$ NSs. Developed a conceptual prototype and tested with multiple bacterial strains and a viral strain, demonstrating the utility of the method for practical applications.

15 Claims, 11 Drawing Sheets

(51) Int. Cl.

| | |
|---|---|
| *B01D 69/10* | (2006.01) |
| *B01D 69/14* | (2006.01) |
| *B01D 71/02* | (2006.01) |
| *B01J 27/051* | (2006.01) |
| *B01J 35/00* | (2006.01) |
| *B01J 35/10* | (2006.01) |
| *B01J 37/34* | (2006.01) |
| *C01G 39/06* | (2006.01) |
| *C02F 1/30* | (2006.01) |
| *C02F 1/44* | (2006.01) |

(52) U.S. Cl.
CPC .......... *B01D 69/10* (2013.01); *B01D 69/145* (2013.01); *B01D 71/022* (2013.01); *B01J 27/051* (2013.01); *B01J 35/004* (2013.01); *B01J 35/0013* (2013.01); *B01J 35/1061* (2013.01); *B01J 37/348* (2013.01); *C01G 39/06* (2013.01); *C02F 1/30* (2013.01); *C02F 1/442* (2013.01); *B01D 2323/26* (2013.01); *C01P 2004/24* (2013.01); *C02F 2303/04* (2013.01); *C02F 2305/023* (2013.01); *C02F 2305/10* (2013.01)

(56) References Cited

FOREIGN PATENT DOCUMENTS

| | | |
|---|---|---|
| CN | 106241878 A | 12/2016 |
| CN | 106495221 A | 3/2017 |
| WO | 2017053466 A1 | 3/2017 |

OTHER PUBLICATIONS

A. Jaworek et al. "Electrospraying route to nanotechnology: An overview", Jan. 28, 2008.*

Weifeng Li et al., "A Tunable, Strain-Controlled Nanoporous MoS2 Filter for Water Desalination", ACS NANO, Jan. 22, 2016, 1-17 pages, http://pubs.acs.org, DOI: 10.1021/acsnano.5b05250, ACS Publications, Washington D.C. U.S.A., 18pp.

Zhongying Wang et al., "Environmental Applications of 2D Molybdenum Disulfide (MoS2) Nanosheets", Environmental Science & Technology, Jun. 29, 2017, 1-42 pages, http://pubs.acs.org, DOI: 10.1021/acs.est.7b01466, ACS Publications, Washington D.C. U.S. A., 43pp.

Mohammad Heiranian, "Molybdenum Disulfide Nanoporous Membranes for Water Desalination", 2016, Urbana, Illinois 2016, 39pp.

Mohammad Heiranian, "Water desalination with a single-layer MoS2", Nature Communications, Oct. 14, 2015, 1-6 pages, http://www.nature.com/naturecommunications, DOI: 10.1038/ncomms9616, Macmillan Publishers Limited., Urbana, Illinois, U.S.A., 6pp.

Jianlong Kou et al., "Nanoporous Two-Dimensional MoS2 Membrane for Fast Saline Solution Purification", Electronic Supplementary Information, 2016, 1-3 pages, Electronic Supplementary Material (ESI) for Physical Chemistry Chemical Physics., 3pp.

* cited by examiner

METHOD FOR CREATING NANOPORES IN MOS$_2$ NANOSHEETS BY CHEMICAL DRILLING FOR DISINFECTION OF WATER UNDER VISIBLE LIGHT

RELATED APPLICATIONS

The present application is a National Phase of International Application No. PCT/IN2018/050677, filed Oct. 18, 2018, and claims priority based on Indian Patent Application No. 201741037148, filed Oct. 20, 2017.

FIELD OF THE INVENTION

The present invention relates to a new method for creating nanopores in single layer MoS$_2$ nanosheets (NSs). More specifically it relates to creating nanoscale holes in chemically synthesized MoS$_2$ nanosheets (NSs) by electrospraying Ag ions. These nanoporous MoS$_2$ NSs are highly effective in both water desalination and disinfection.

BACKGROUND OF THE INVENTION

In the recent past, graphene a two-dimensional allotrope of carbon received huge interest of researchers globally due to its interesting properties [Guo S et al., Chem. Soc. Rev. 2011, 40 (5), 2644-2672]. Graphene, the basic building block of graphite has very interesting properties like Quantum Hall Effect [Zhang, Y et al., Nature (London, U.K.) 2005, 438 (7065), 201-204; Taychatanapat T et al., Nat. Phys. 2011, 7 (8), 621-625], ballistic electron transport [Yazyev O. V et al., Nat. Mater. 2010, 9 (10), 806-809; Chen F et al., Acc. Chem. Res. 2009, 42 (3), 429-438], high conductivity [Heersche, H. B et al., Nature (London, U.K.) 2007, 446 (7131), 56-59; Miao F et al., Science (Washington, D.C., U.S.) 2007, 317 (5844), 1530-1533; Zhou, S. Y et al., Nat. Phys. 2006, 2 (9), 595-599], unusual chemical reactivity [Sen Gupta, S et al., ACS Sustainable Chem. Eng. 2015, 3 (6), 1155-1163], photosensitivity [Chitara, B et al., Adv. Mater. (Weinheim, Ger.) 2011, 23 (45), 5419-5424], bio-sensing [Jung, J. H et al., Angew. Chem., Int. Ed. 2010, 49 (33), 5708-5711, S5708/1-S5708/4], battery applications [Su, Y et al., ACS Nano 2012, 6 (9), 8349-8356; Fang, Y et al., J. Am. Chem. Soc. 2013, 135 (4), 1524-1530], etc. Other 2D materials of similar layered structure, for example, molybdenum disulfide (MoS$_2$) is one of the examples of the large family of 2D metal chalcogenides. These metal chalcogenides can be represented by a general formula of MX2, where M is the metal and X represents the chalcogen (S, Se, Te). These 2D metal chalcogenides also have interesting properties like graphene [Seo, J.-W et al., Angew. Chem., Int. Ed. 2007, 46 (46), 8828-8831; Lee, H. S et al., Nano Lett. 2012, 12 (7), 3695-3700; Yin, Z et al., ACS Nano 2012, 6 (1), 74-80; Zhou, W et al., Small 2013, 9 (1), 140-147]. For example, they have properties such as catalysis [Xie, J et al., Adv. Mater. (Weinheim, Ger.) 2013, 25 (40), 5807-5813], light harvesting, hydrogen evolution reaction [Xie, J et al., Adv. Mater. (Weinheim, Ger.) 2013, 25 (40), 5807-5813; Lukowski, M. A et al., J. Am. Chem. Soc. 2013, 135 (28), 10274-10277], biomolecules detection [Zhu, C et al., J. Am. Chem. Soc. 2013, 135 (16), 5998-6001], lithium ion storage [Jiang, H et al., Adv. Mater. (Weinheim, Ger.) 2015, 27 (24), 3687-3695; Xu, X et al., Nanoscale 2014, 6 (10), 5245-5250], etc.

Both theoretical [Hinnemann, B et al., J. Am. Chem. Soc. 2005, 127 (15), 5308-5309] and experimental [Jaramillo, T. F et al., Science (Washington, D.C., U.S.) 2007, 317 (5834), 100-102] studies have shown that the edges of these 2D sheets are more active catalytically than the basal surface. Hence, defect-rich MoS$_2$ nanosheets (NSs) are of more interest to researchers due to their increased effective surface area [Xie, J et al., Adv. Mater. (Weinheim, Ger.) 2013, 25 (40), 5807-5813]. Creating such defects to a single layer MoS$_2$ sheet still remains a challenge. Such defects can be created by atom bombardment, which requires sophisticated instrumentation. Whereas, in recent past, we have developed a methodology for creating functional nanomaterials under ambient conditions which require no sophisticated instrumentation. Dimensionality of the materials can be controlled easily in this method. Using the same method, defect rich 2D nanosheets can be created for an advanced application like disinfection of water.

Water scarcity is one of the main problems of the modern world. Rapid, energy efficient desalination and disinfection processes are required to address the problem [Shannon, M. A et al., Nature (London, U.K.) 2008, 452 (7185), 301-310; Schwarzenbach, R. P et al., Science (Washington, D.C., U.S.) 2006, 313 (5790), 1072-1077; Liu, C et al., Nano Lett. 2013, 13 (9), 4288-4293; Logan, B. E et al., Nature (London, U.K.) 2012, 488 (7411), 313-319]. 2D nanomaterials like graphene has shown to be an efficient material for water purification. There are several reports where graphene-based materials were used for the removal of arsenic [Chandra, V et al., ACS Nano 2010, 4 (7), 3979-3986], ions [Cohen-Tanugi, D et al., Nano Lett. 2012, 12 (7), 3602-3608; Han, Y et al., Adv. Funct. Mater. 2013, 23 (29), 3693-3700; Pugazhenthiran, N et al., ACS Appl. Mater. Interfaces 2015, 7 (36), 20156-20163], dyes [Ramesha, G. K et al., J. Colloid Interface Sci. 2011, 361 (1), 270-277; Li, B et al., J. Mater. Chem. 2011, 21 (10), 3346-3349; Ai L.-H et al., J. Hazard. Mater. 2011, 192 (3), 1515-1524], antibiotics [Gao, Y et al., J. Colloid Interface Sci. 2012, 368 (1), 540-546], pesticides, etc. Recent reports also show that MoS$_2$ NSs has potential utility in water purification [Li, Q et al., Langmuir 2014, 30 (29), 8965-8972; Li, W et al., ACS Nano 2016, 10 (2), 1829-1835]. These NSs are also potential candidates for desalination as well as disinfection of water. A recent computational study shows that MoS$_2$ NSs with nanopores can effectively do desalination of water. They have also shown that water flux is higher (70% higher than the graphenenanopores) for a hole with Mo rich edges [Heiranian, M et al., Nat. Commun. 2015, 6, 8616]. In another very recent report, MoS$_2$ NSs were shown to be effective for the disinfection of water under visible light. They have shown that the reactive edges of the NSs are responsible for the generation of active oxygen species like H$_2$O$_2$ which, in turn, is the cause of disinfection [Liu, C et al., Nat. Nanotechnol. 2016]. These reports prove the tremendous potential of defect rich MoS$_2$ NSs.

For the first time, this invention provides an easy, cost-effective, ambient, solution-based method to create nanopores in single layer MoS$_2$ nanosheets. In this process, Ag ions are electrosprayed on a water suspension of chemically synthesized MoS$_2$ NSs. In the course of deposition, Ag ions react with the NSs and form Ag$_2$S, leaving them with defects. The size of the holes can be controlled by varying the deposition time. These nanoporous MoS$_2$ NSs is highly reactive due to the increase in effective surface area and are effective in both water desalination and disinfection.

SUMMARY OF THE INVENTION

The present invention relates to a new method for creating nanopores in single layer MoS$_2$ nanosheets (NSs). More specifically relates to the creation of nanoscale holes in chemically synthesized $MoS_2$ nanosheets (NSs) by electrospraying Ag ions.

In one embodiment, the present invention provides an easy, cost-effective, ambient, solution-based method to create nanopores in single layer $MoS_2$ nanosheets. The nanoholes are created by electrospraying of Ag ions on a water suspension of chemically synthesized $MoS_2$ NSs, wherein the Ag ions react with the nanosheets and forms $Ag_2S$, leaving the nanosheets with defects. This reaction process will make the $MoS_2$ NSs porous, with Mo-rich edges.

In another embodiment, the present invention illustrates electrospray deposition of reactive ions on a substrate which can make interesting new materials. For example, an electrospray deposition of Ag ions on $MoS_2$ nanosheets creates nanoscale holes by reacting it with charged droplets of silver acetate. Wherein, the Ag ions are from various salts of silver including silver acetate, silver nitrate and silver perchlorate.

In other embodiment, the present invention provides a new material used for effective disinfection and desalination of water. Electrospray deposition of silver acetate on chemically synthesized $MoS_2$ nanosheets reacts and forms $Ag_2S$ which creates holes in the nanosheets. This reaction process will make the $MoS_2$ NSs porous, with Mo-rich edges. These nanoporous $MoS_2$ NSs will be highly effective in both water desalination and disinfection. High reactivity of the porous nanosheets is due to the increase in the effective surface area. Mo enriched pores will lead to the larger flux of water, much larger than graphene. The edges of $MoS_2$ NSs are responsible for their unusual reactivity. These NSs, with tiny holes in it, will have more reactive edges to show enhanced reactivity. Moreover, chemical drilling with metal ions like $Ag^+$ make the $MoS_2$ nanosheets photocatalytically more active which increases the ROS generation and disinfection efficiency. A working prototype is developed using immobilized nanosheets on oxide supports for water disinfection using low power LEDs.

Figure 1:
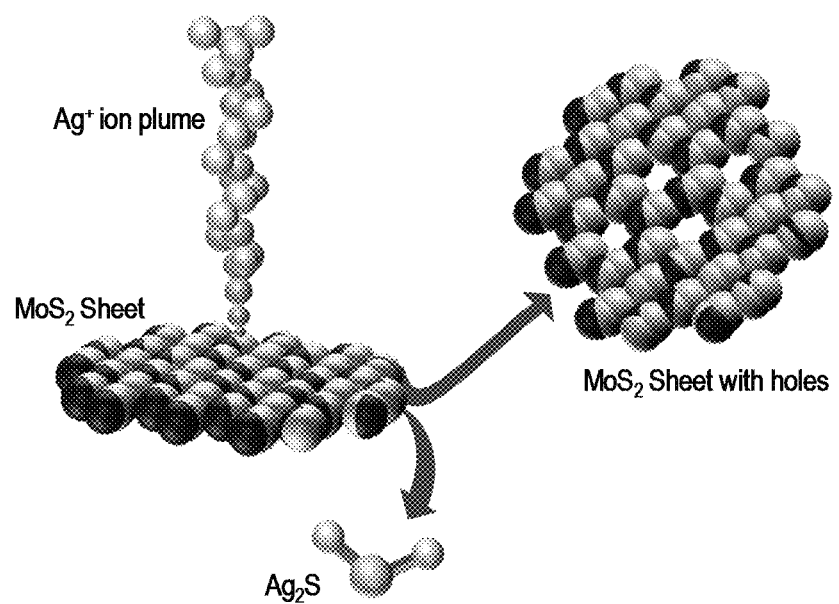
FIG. 1 shows drilling of $MoS_2$ NSs by ambient ions. Schematic representation of chemical drilling of $MoS_2$ NSs using electrospray deposited $Ag^+$ ions.

Referring to the drawings, the embodiments of the present invention are further described. The figures are not necessarily drawn to scale, and in some instances the drawings have been exaggerated or simplified for illustrative purposes only. One of ordinary skill in the art may appreciate the many possible applications and variations of the present invention based on the following examples of possible embodiments of the present invention.

DETAILED DESCRIPTION OF THE INVENTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The present invention relates to a new method for creating nanopores in single layer $MoS_2$ NSs. More specifically relates to creating nanoscale holes in chemically synthesized $MoS_2$ NSs by electrospraying Ag ions.

The present invention provides an easy, cost-effective, ambient, solution-based method to create nanopores in single layer $MoS_2$ nanosheets. The nanoholes are created by electrospraying Ag ions on a water suspension of chemically synthesized $MoS_2$ NSs, wherein the Ag ions react with the nanosheets and forms $Ag_2S$, leaving them with defects. This reaction process will make the $MoS_2$ NSs porous, with Mo-rich edges.

The present invention illustrates electrospray deposition of reactive ions on a substrate which can make interesting new materials. For example, an electrospray deposition of Ag ions on $MoS_2$ NSs creates nanoscale holes by reacting it with charged droplets of silver acetate. Wherein, the Ag ions are from various salts of silver including silver acetate, silver nitrate and silver perchlorate.

The present invention provides a new material used for effective disinfection and desalination of water. Electrospray deposition of silver acetate on chemically synthesized $MoS_2$ nanosheets reacts and forms $Ag_2S$ which creates holes in the nanosheets. This reaction process will make the $MoS_2$ NSs porous, with Mo-rich edges. These nanoporous $MoS_2$ NSs will be highly effective in both water desalination and disinfection. The high reactivity of the porous NSs is due to the increase in effective surface area. The edges of $MoS_2$ NSs are responsible for their unusual reactivity. Mo enriched pores may lead to larger flux of filtered water, much larger than graphene. These NSs, with tiny holes in it, will have more reactive edges to show enhanced reactivity. Moreover chemical drilling with metal ions like $Ag^+$ make the $MoS_2$ nanosheets photo catalytically more active which increase the ROS generation and disinfection efficiency.

The following description details the method and application of the new material and explains the experimental parts for creating a hole in a chemically synthesized substrate by chemical drilling.

All the commercially available chemicals were used as is, without any further purification. Silver acetate (AgOAc), molybdenum disulfide ($MoS_2$), 1.6 M n-butyllithium in hexane and solvent hexane were purchased from Sigma Aldrich, India.

Synthesis of $MoS_2$ NS:

Chemical exfoliation method was used to synthesize $MoS_2$ NSs, from $MoS_2$ powder. 300 mg of $MoS_2$ powder was taken under an argon atmosphere and 3 mL of 1.6 M n-butyllithium was added to it. The resulting solution was stirred for 2 days under the same atmosphere. Then the resulting lithium intercalated product was washed repeatedly with hexane to remove unreacted reactants followed by addition of 80 mL of distilled water. The resulting solution was sonicated in a bath sonicator for 1 h. Then the aqueous dispersion of $MoS_2$ NSs was centrifuged at a speed of 10000 rpm to remove bulk, un-exfoliated $MoS_2$. The quality of the synthesized $MoS_2$ NSs was checked using electron microscopy, UV-Vis and Raman spectroscopy. The concentration of $MoS_2$ dispersion was determined using inductively coupled plasma mass spectrometry (ICP MS).

Electrospray deposition on $MoS_2$ NSs:

For electrospray deposition, a home built nanoelectrospray ionization (nESI) source was made. The nESI tip was made by pulling a borosilicate glass capillary into two, using a micropipette puller (Sutter Instruments, U.S.A.). Each tip, after pulling, was checked using a microscope to ensure the size and quality of the cut. Tips with an opening of 10-15 μm were used for all deposition experiment. 10 mM aqueous solution of AgOAc was filled in the nESI tips using a microinjector pipette tip and it was connected to a platinum electrode, for high voltage connection. For deposition on $MoS_2$ NSs, an aqueous suspension of 3.7 mM (in terms of Mo) $MoS_2$ NS was taken in a properly shaped Eppendorf vial and deposition was performed. The water suspension of $MoS_2$ was connected to ground through a picoammeter. The deposition current was varied from 20-100 nA for different experiments.

FIG. 1 schematically shows the chemical drilling process of $MoS_2$ NSs. When a potential of 2-2.5 kV was applied to the nESI source, filled with aqueous solution of AgOAc, through a Pt wire electrode, a spray plume of solvated $Ag^+$ ions was seen. FIG. 1 shows the $Ag^+$ ion plume schematically. Then the plume was directed towards a grounded aqueous suspension of $MoS_2$ NSs. Ag ions react with the NSs and form $Ag_2S$ nanoparticles (NPs). With time, $Ag_2S$ NPs go into water resulting in nanoporous $MoS_2$ NSs. The reaction of $Ag^+$ ions with $MoS_2$ NSs in bulk solution phase converting $MoS_2$ NSs completely to $Ag_2S$ was reported recently from our group [Mondal B, et al., Nanoscale 2016, 8 (19), 10282-10290].

Figure 2:
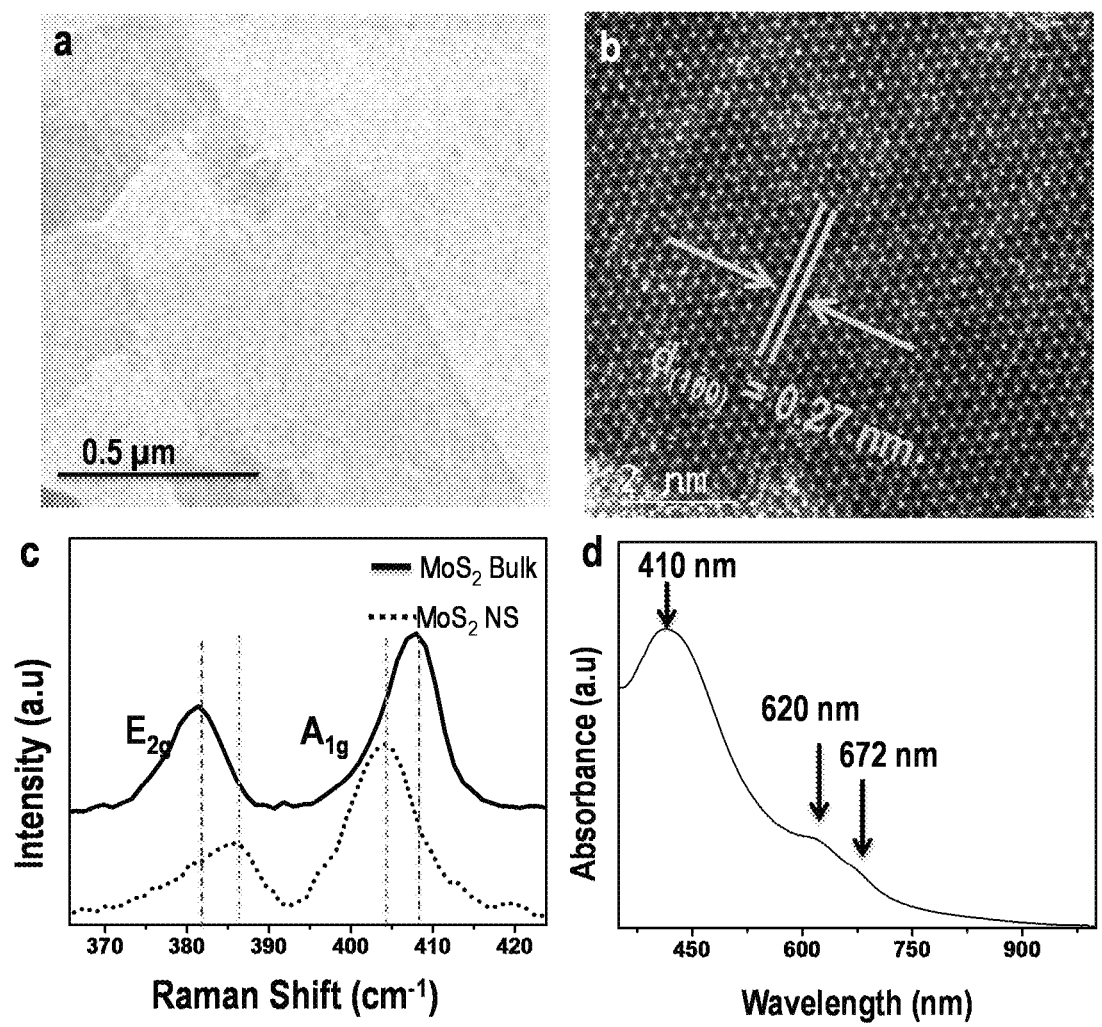
FIG. 2 shows characterization of $MoS_2$ NSs. (a) TEM image of as-synthesized $MoS_2$ nanosheet. (b) HAADF TEM image of (a) $MoS_2$ nanosheet showing that there are no defects in it. (c) Raman spectrum collected from the $MoS_2$ nanosheet and bulk $MoS_2$. The peak difference (~18 $cm^{-1}$) of $E_{2g}$ and $A_{1g}$ for $MoS_2$ NSs suggests that the sheets are one layer thick. (d) UV-Vis spectrum collected from a suspension of $MoS_2$ NSs.

To prove that the deposition of ions followed by the reaction is the only reason for the defects in $MoS_2$ NSs, a detailed characterization of synthesized NSs were done. FIG. 2 shows the characterization of as synthesized $MoS_2$ NSs using various spectroscopic and microscopic techniques. FIGS. 2a and 2b show TEM images of the $MoS_2$ NSs at different magnifications. From the TEM images, it is clearly seen that with our synthesis, we have obtained thin single layer sheets of $MoS_2$ in the nanometer dimension.

From the high-resolution TEM (HRTEM) image (FIG. 2b) it is clear that the sheets are single crystalline in nature. Raman spectroscopic measurement of the synthesized NSs also shows the 2c nature of them. FIG. 2c shows Raman spectra collected from $MoS_2$ NSs (dotted line) and $MoS_2$ bulk (solid line), respectively. Peaks at 387 $cm^{-1}$ ($E_{2g}$) and 409 $cm^{-1}$ ($A_{1g}$) prove the 2D nature of the NSs. The increase in FWHM for NSs and the softening of $A_{1g}$ and $E_{2g}$ bands indicate the successful exfoliation of bulk $MoS_2$ to 2D nano scale form. UV-Vis spectrum is taken from the aqueous suspension also proves the 2D nature of the NSs. This characterization and imaging of the as-synthesized NSs proved that they are defectless single crystalline sheets made of $MoS_2$. FIG. 2d shows the UV-Vis spectrum of as-synthesized $MoS_2$ NSs.

Figure 3:
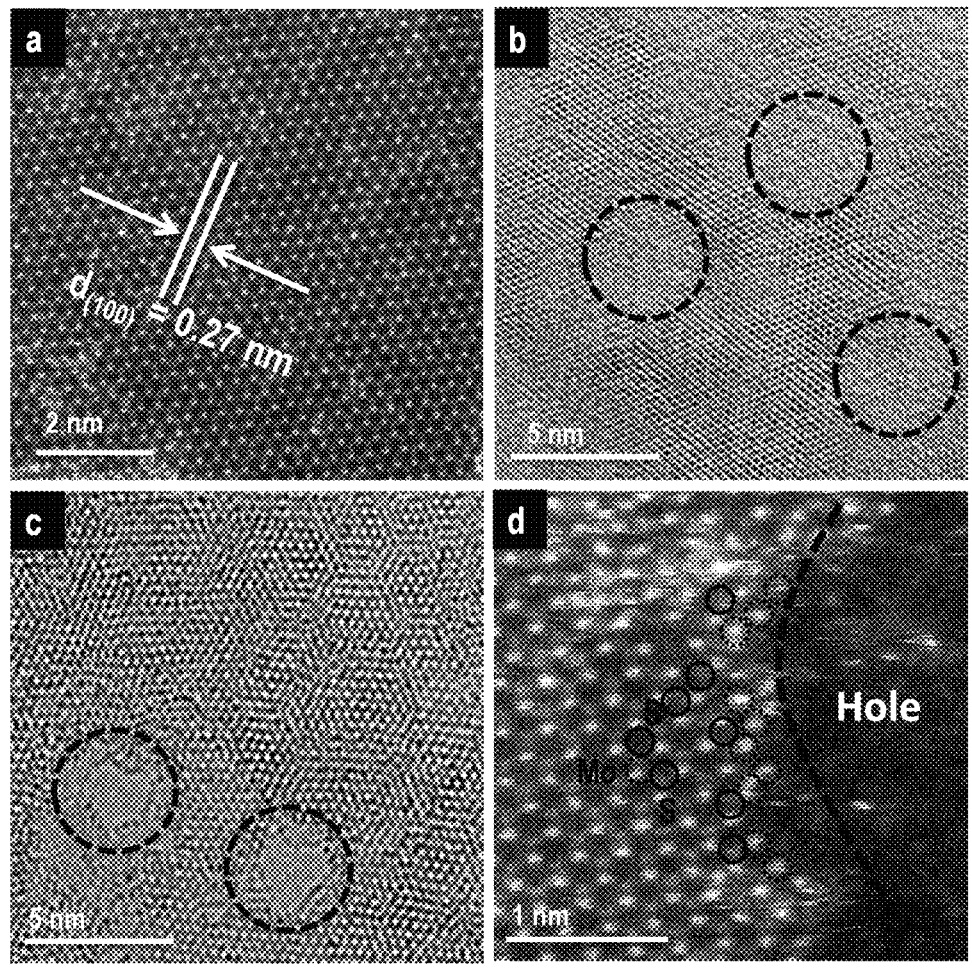
FIG. 3 shows characterization of holey $MoS_2$ NSs. (a) STEM image of the as-synthesized $MoS_2$ NSs showing no defects in it. (b) HRTEM image of a $MoS_2$ NS, floating on water after the deposition process, with holes. (c) STEM image of the same showing clear holes on a single NS. (d) HAADF STEM image of a holey $MoS_2$ NS taken from the subphase showing a Mo enriched edge. Black circles in image (d) denote Mo and the dotted circles represent S.

With these $MoS_2$ NSs, the electrospray deposition experiments were done. The deposition time and rate were optimized by trial and error based method. In a typical experiment, $Ag^+$ ions were electrosprayed on $MoS_2$ NSs suspension (3.7 mM with respect to Mo) for 30 min at a deposition current of 60 nA. After the deposition, a portion of the NSs was seen floating on the water surface and rest of it was still in the bulk. Both of these categories of NSs were taken on a carbon coated TEM grid for imaging. FIG. 3a shows a STEM image of the as-synthesized $MoS_2$ NS. The HRTEM image (collected from the floating layer of NSs) in FIG. 3b shows the presence of holes (indicated with dotted circles) in a $MoS_2$ NS. The HRTEM image was taken from a single layer $MoS_2$ NS to prove the clear discontinuity of the lattice planes. FIG. 3c shows a STEM image of $MoS_2$ NSs after the creation of holes. The image clearly shows part of a hole in a single crystalline NS present in bulk water. The dimensions of the holes were in the range of 3-5 nm. We speculate dynamics of the suspended NSs on the liquid surface during deposition leading to the creation of holes in all the NSs. This motion can be due to the transfer of charged droplets on the water surface in presence of a tangential electric field. From the independent experiments, we know that hydroxyl ions (due to their high mobility), generated due to hydrolysis of water, are the charge carriers from the center of the spray to the ground electrode kept at the rim of the liquid reservoir, causing a hydrodynamic flow in the liquid. This flow may be the reason for the presence of nanoporous sheets both on the surface of the water and in the bulk. To see the fate of the NSs with longer deposition time, an experiment was performed where the deposition time was kept at 2 h. In this case, the whole NS was reacted and got converted to $Ag_2S$ NPs. The process of the selective reaction of incoming $Ag^+$ ions makes the holey $MoS_2$ NSs porous with Mo-rich edges. HAADF STEM image shown in FIG. 3d clearly shows the Mo enriched edges of the holes in a single layer $MoS_2$ NS. From FIG. 2d, the distance between the two Mo atoms is 0.26 nm. Considering the holes as a circle of 3 nm diameter, the number of Mo atoms per hole is ~35. Thus, due to hole formation, a 1 μm×1 μm NS exposes ~$2.7×10^5$ additional Mo atoms. Note that the STEM image of FIG. 3c suggests >7800 holes per 1 $μm^2$. This process of creating nanoscale holes on 2D sheets by ambient ion reactions is referred to as chemical drilling. Low deposition time has maintained in order to control the size of the holes. For this reason, in all our experiments of creating nm sized holes in the $MoS_2$ NSs (except the control experiment showing longer deposition leading to complete reaction of the NSs to form $Ag_2S$ NPs), the concentration of the $Ag_2S$ NPs formed was negligible in comparison to the amount of $MoS_2$ in solution. From an earlier report, it's evident that such small holes with enriched Mo have the highest efficiency in water purification [Heiranian M et al., Nat. Commun. 2015, 6, 8616]. Hence, these 2D sheets of $MoS_2$ are potential candidates for efficient desalination. On the other hand, with increased active surface area, due to the presence of a large number of edges, they can act as more reactive entities for other applications like disinfection of water.

Disinfection of Water:

The photocatalytic disinfection performance of nanoporous $MoS_2$ sheets was then checked under visible light and the disinfection efficiency was then compared with the controls; namely as synthesized $MoS_2$ NSs under visible light at the same concentration of $Ag^+$ used for chemical drilling and an equal mass of bulk $MoS_2$ under same experimental conditions.

A Xenon lamp equipped with UV filter was used as a light source. In an aspect, 10 mL of synthetic water (typically containing Escherichia coli ATCC 25922 in a concentration of $1×10^7$ CFU/mL, unless otherwise mentioned) was used. A high concentration of the bacterial input was maintained considering the activity of the proposed material in the treatment of water from challenging environments. 1 mL of the diluted samples was plated along with nutrient agar on a sterile petridish using the pour plate method after 2 h reaction time. After 48 h of incubation at 37° C., the colonies were counted and recorded.

Figure 4:
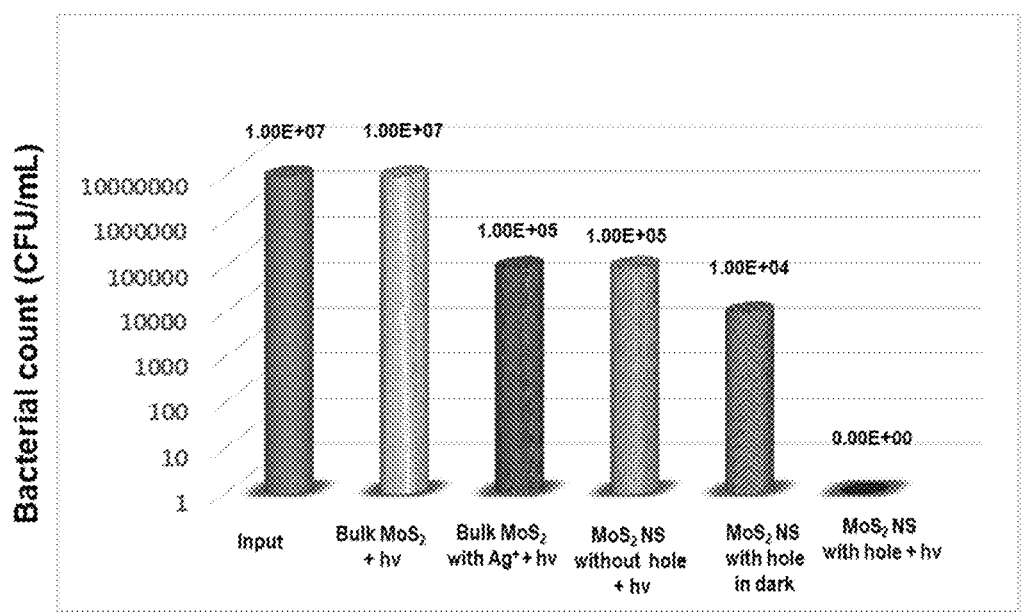
FIG. 4 shows anti-bacterial performance of holey $MoS_2$ NSs. The antibacterial activity of the porous $MoS_2$ NSs, with Mo-rich edges is compared with bulk $MoS_2$, bulk $MoS_2$ with the same amount of Ag used for drilling, $MoS_2$ NSs without holes and holey $MoS_2$ NSs in dark. In all the experiments, parameters like, light intensity, irradiation time (2 h), sample concentrations, etc., were maintained constant. The entire visible spectrum was exposed to the sample although one frequency (v) is mentioned. The test organism used was *E. coli*.
Figure 6:
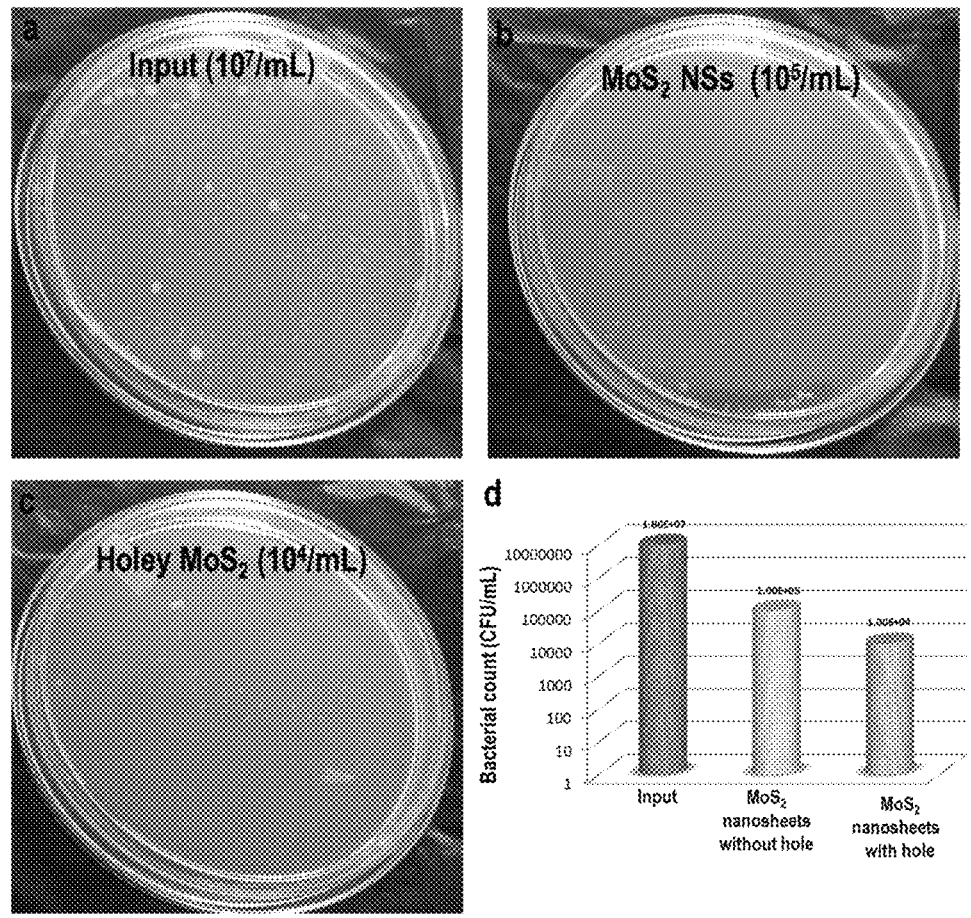
FIG. 6 shows antibacterial performance of holey $MoS_2$. (a-c) Photograph of the antibacterial activity (with *Bacillus subtilis* bacteria) of $MoS_2$ NSs shown in (b) and with holey $MoS_2$ shown in (c). (a) Input bacterial concentration and (d) comparison of antibacterial activity of $MoS_2$ NSs and holey $MoS_2$.

Disinfection of bacteria: To check the efficiency of disinfection of holey $MoS_2$ NSs, a series of experiments are performed along with several control experiments. The disinfection efficiency of the $MoS_2$ NSs are tested using bacteria and virus-contaminated water. FIG. 4 shows that when the contaminated water exposed to porous $MoS_2$ NSs and visible light showed 10,000,000 times reduction in bacteria, from $10^7$ CFU/mL to $10^0$ CFU/mL for E. coli (or 7 log reduction), in 2 h whereas the as-synthesized $MoS_2$ NSs and bulk $MoS_2$ with equivalent concentration of Ag, used for the drilling process, showed only 1% of disinfection efficiency (or 2 log reduction) (FIG. 4). But holey $MoS_2$ NSs in dark showed only 3 log reduction (FIG. 4) in the bacteria count. It is noted that $Ag^+$ at a concentration above 50 ppb can be an excellent disinfectant. Under the same experimental conditions, bulk $MoS_2$ showed negligible disinfection efficiency for the mentioned bacterial input. This suggests that chemical drilling makes the $MoS_2$ nanosheets photocatalytically more active. The Mo-rich defects in the NSs provide enhanced active surface area for the generation of reactive oxygen species (ROS). The disinfection efficiency of the material is tested with gram-positive bacteria also (Bacillus subtilis). It is noticed that Bacillus subtilis are more resistive towards $H_2O_2$ than E. coli under the same experimental conditions (FIG. 6).

The following description shows that the holey $MoS_2$ NSs are more efficient in generating at least one ROS species, namely $H_2O_2$. The disinfection efficiency of $Ag^+$ alone was also examined under the same experimental conditions taking the same amount of $Ag^+$ ions used for chemical drilling. $Ag^+$ ions showed a negligible effect on E. coli inactivation because the concentration of $Ag^+$ was 0.2 μM, much lower than the concentration needed for disinfection at a bacterial load of $10^7$ CFU/mL.

Figure 5:
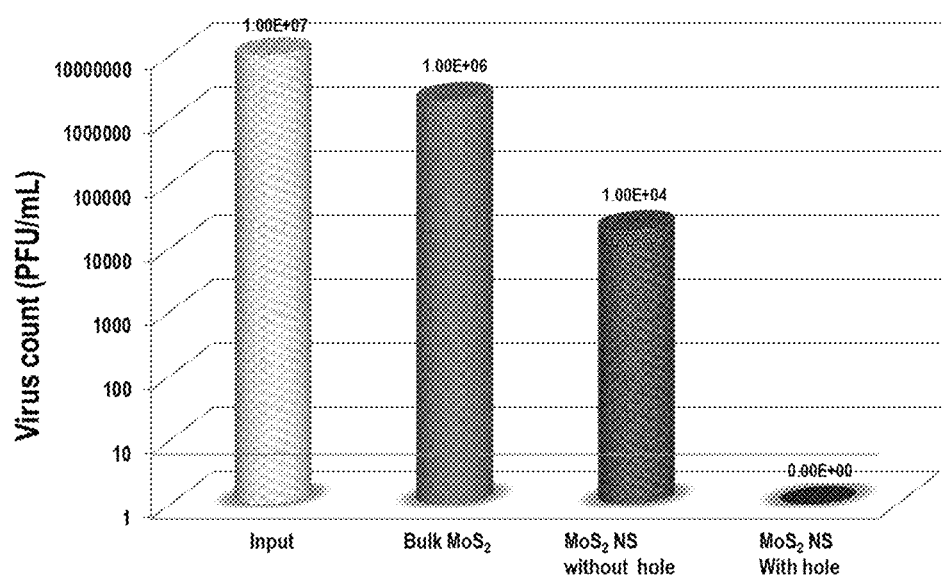
FIG. 5 shows the comparison of the antiviral activity of the porous $MoS_2$ NSs, with Mo-rich edges. The activity is compared with bulk $MoS_2$ and $MoS_2$ NSs without holes. The test organisms used was F-specific bacteriophage MS2 grown on *E. coli* (ATCC 15597-B1). In all the experiments, parameters like, light intensity, irradiation time (2 h), sample concentrations, etc., were maintained constant. The entire visible spectrum was exposed to the sample although one frequency (v) is mentioned.

Disinfection of viruses: Considering the fact that the major water purification techniques used for virus removal are the addition of chlorine which produces harmful disinfection byproducts, however the proposed holey $MoS_2$ NSs could serve as an efficient method to reduce pathogenic viruses by a safer method. The bulk $MoS_2$ with and without $Ag^+$ and $MoS_2$ NSs without holes are unable to affect the phage significantly, the porous $MoS_2$ NSs are found to achieve a 7 log reduction by photocatalytic disinfection (FIG. 5). Moreover, this experiment proves that this method can disinfect virus at comparatively higher concentrations.

Figure 7:
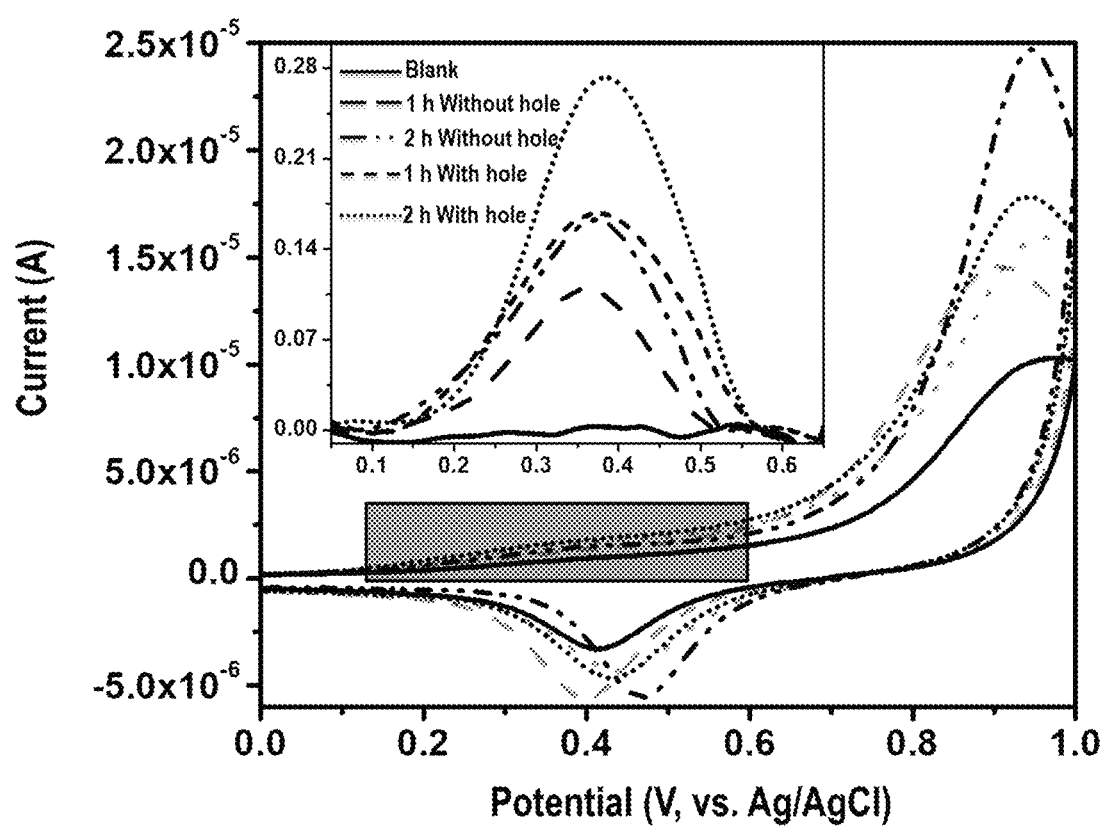
FIG. 7 shows quantitative detection of $H_2O_2$ using CV. Cyclic voltammetry (CV) traces of 5 mL of $MoS_2$ solution, in phosphate buffered saline (PBS), using a gold electrode. Inset shows background corrected CV traces of holey $MoS_2$ and $MoS_2$ NSs without hole.
Figure 8:
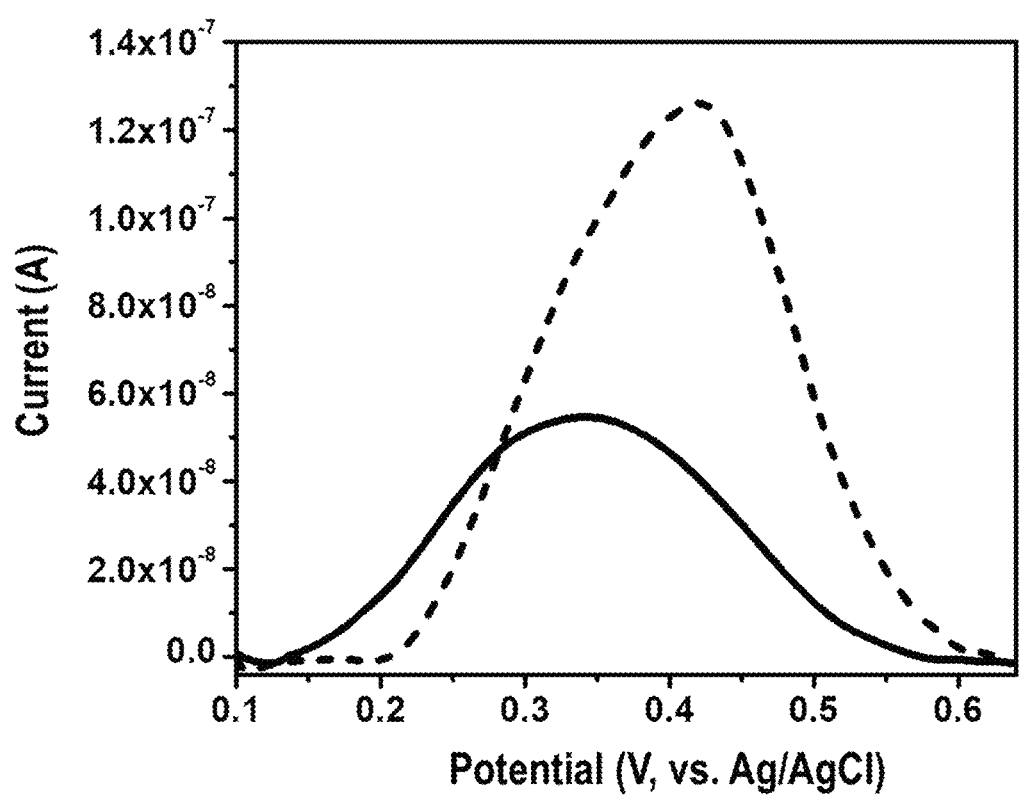
FIG. 8 shows linear sweep voltammetry (LSV) profile of $MoS_2$ NS suspensions with different time of spraying of $Ag^+$. LSV spectrum $MoS_2$ NSs suspension after 10 and 20 min of $Ag^+$ deposition and 1 h of visible light irradiation.

From earlier reports, it is known that $MoS_2$ in presence of visible light can generate active oxygen species like $H_2O_2$. Chong Liu et. al. has shown that the edges of $MoS_2$ NSs are more active in this reaction. Thus the generation of $H_2O_2$, in presence of visible light is one of the reasons for the disinfection of water. To prove that the holey $MoS_2$ is more efficient for the production of $H_2O_2$, a set of cyclic voltammetry (CV) experiments are performed. For all the CV experiments, a pre-cleaned gold electrode is used as the working electrode, Ag/AgCl is used as the reference electrode and Pt is used as the counter electrode. Prior to CV measurements of each sample, 5 mL of as-synthesized $MoS_2$ suspension was dried at 55° C. in a glass bottle. Subsequently, CV experiments are performed by adding 5 mL of 1 M phosphate buffered saline (PBS, pH~7.3) to the bottle having previously dried $MoS_2$ and electrochemical experiment is performed after exposing the dispersion to visible light (for 1 or 2 h, depending on the experiment). CV of each sample was performed from 0 to +1 V with a fixed scan rate of 100 mV/s. CV profiles of Au, performed in blank solution (only PBS), as well as in PBS along with as synthesized $MoS_2$ NSs and holey $MoS_2$ NSs irradiated with visible light for 1 h and 2 h, respectively are shown in FIG. 7. Each CV profile has two major peaks, one observed around +0.95 V corresponds to the formation of $AuCl_4^-$ during the forward potential scan (0 to +1V) and another around +0.43 V due to the reduction of gold chloride in the reverse potential scan (+1V to 0). Along with these, a small hump is observed in the CV scan, around +0.45 V (marked portion in the spectrum was multiplied 3 times for better visualization) which corresponds to the oxidation of $H_2O_2$. In the course of the reaction, M-OH or M=O might be formed as intermediates which ultimately get converted to ROS. Although the reaction mixture with as synthesized $MoS_2$ NSs shows some amount of $H_2O_2$, the holey $MoS_2$ NSs are more efficient in the generation of $H_2O_2$ because of the presence of enhanced reactive surface area. To prove the fact that defects in the $MoS_2$ sheets have a significant role in $H_2O_2$ generation, a control experiment is carried out. In this experiment, two sets of holey $MoS_2$ samples are synthesized by varying the deposition time of $Ag^+$ (10 and 20 min at a deposition rate of 100 nA). More deposition time will enable the creation of more holes in NSs. All the other parameters are kept constant and the CV is measured successively. FIG. 8 shows the feature corresponding to $H_2O_2$ in the voltammogram. The $H_2O_2$ concentration is higher in the second sample, i.e. the $MoS_2$ NSs with more holes (Ag deposition for 20 min). The disinfection process involves other ROS species also, yet the focus of the invention is to detect $H_2O_2$.

Figure 9:
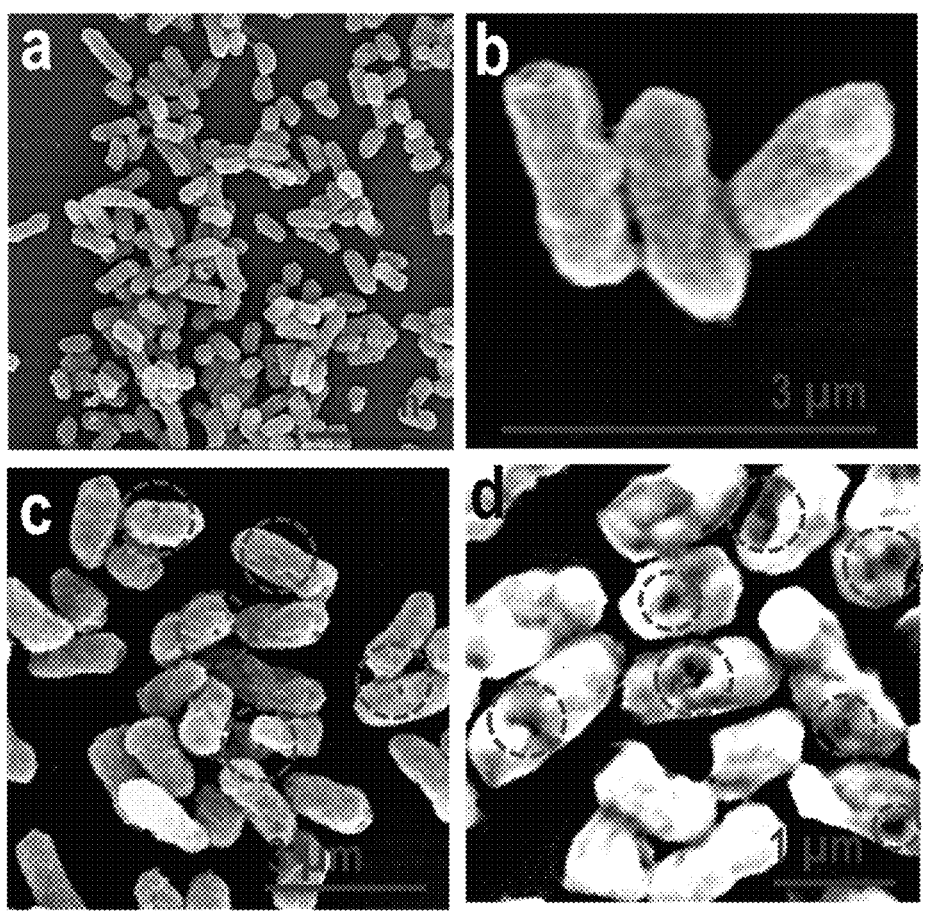
FIG. 9 (a-b) show SEM images of *E. coli* cells before disinfection and (c-d) after disinfection. Circles in c and d show the damage in the cells due to reaction with $H_2O_2$.
Figure 10:
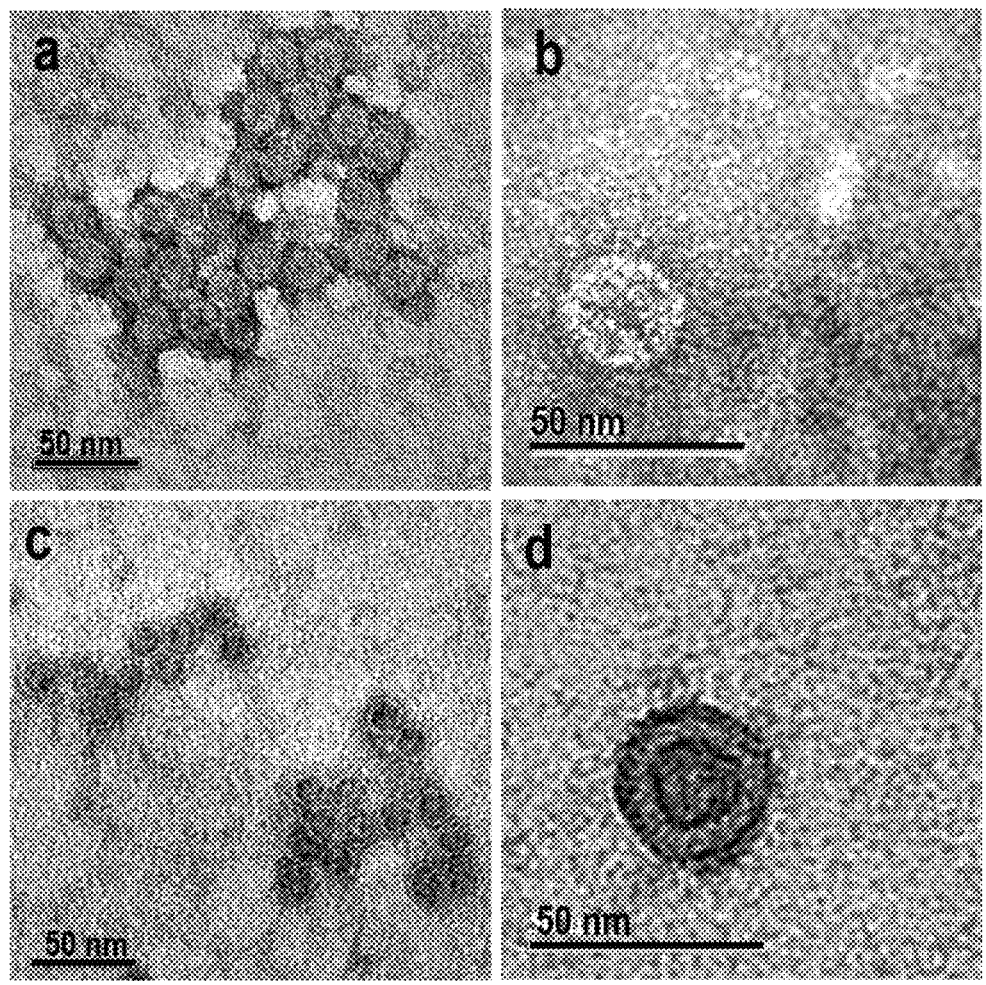
FIG. 10 (a, c) show TEM images of virus before (live virus) and after (dead virus) the treatment with the sample (holey $MoS_2$), respectively. Magnified TEM images of live (b) and dead (d) viruses show the clear contrast difference between the two.

Imaging of Bacteria and Virus Before and After the Treatment with the Sample:

SEM imaging establishes the damage of bacterial cells. FIG. 9a-b show the SEM images of the bacterial cells before disinfection (healthy cells of E. coli). On the other hand, FIGS. 9c-d show the SEM images of dead E. coli cells at different magnifications. It is seen clearly from these images that the bacterial cells are damaged (black circles) due to reaction with $H_2O_2$. TEM images of the virus before (FIG. 10a-b) and after (FIG. 10c-d) irradiation show a clear contrast difference. This is because the uranyl acetate stain enters defective viral capsids and causes a distinct difference in contrast between untreated and treated viruses. Dense dark centered capsids (defective capsids) which had taken up the uranyl acetate stain were seen as dark whereas untreated viruses were rigid and did not show the stain within. All the above disinfection processes were performed under a Xenon arc lamp.

Figure 11A:
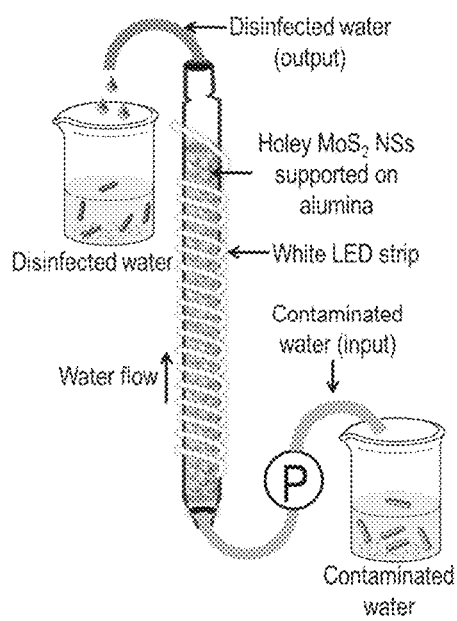
FIG. 11A is a prototype with holey $MoS_2$ for water disinfection using low power LED strips.
Figure 11B:
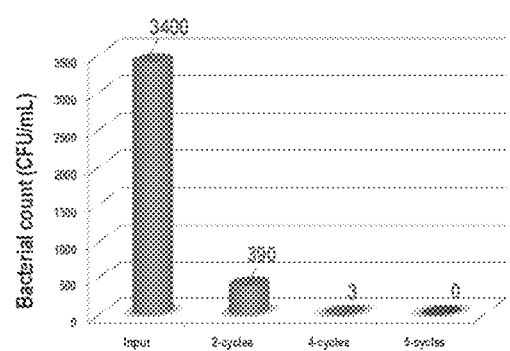
FIG. 11B is a plot of bacterial count after 2-5 cycles of operation.

The present invention provides a working prototype design for the disinfection of water developed using a commercially available low power LED strip. FIGS. 11A and 11B show the schematic representation of a prototype, wherein the prototype comprises holey $MoS_2$ NSs supported on alumina, packed in a borosilicate glass tube (column size and radius was 10 inches and 3 mm inner diameter, respectively) and a LED (4.8 W/m) strip was wrapped around the borosilicate glass tube. Contaminated water was pushed from below using a syringe pump and pure water was collected from the top. Antigravity flow of the contaminated water was chosen for longer contact of it with the holey $MoS_2$ NSs. Contaminated water with bacterial load of $10^3$ CFU/mL was passed through the column multiple times and after each cycle, the sample was taken for plating. The result showed 100% disinfection after 5 cycles (FIG. 11B).

Thus the present invention provides a cheap ambient method for making nanometer size holes in a single crystalline NS. Electrospray deposition of reactive ions on a substrate can make interesting new materials. Resulting porous $MoS_2$ NSs can act as a better membrane for desalination of water. In addition, Mo enriched pores will lead to the larger flux of water, predicted to be much larger than that of graphene [Heiranian, M. et al., Nature Communications 6, 8616 (2015)]. The edges of $MoS_2$ NSs are responsible for their unusual reactivity. These NSs, with tiny holes in it, will have more reactive edges to show enhanced reactivity.

It may be appreciated by those skilled in the art that the drawings, examples and detailed description herein are to be regarded in an illustrative rather than a restrictive manner.

We claim:

1. A method of making nanoscale holes in two dimensional $MoS_2$ nanosheets, the method comprising:
electrospraying deposition of reactive $Ag^+$ ions onto the two dimensional $MoS_2$ nanosheet, wherein the $Ag^+$ ions react with the $MoS_2$ nanosheet forming $Ag_2S$ and a defect-rich $MoS_2$ nanosheet;
generating $H_2O_2$ under visible light using the nanoscale holes in the $MoS_2$ nanosheet; and
exposing contaminated water to the $H_2O_2$ for disinfection.

2. The method of making nanoscale holes in two dimensional $MoS_2$ nanosheets as claimed in claim 1, wherein the $Ag^+$ ions are selected from various salts of Ag comprising silver acetate, silver nitrate, and silver perchlorate.

3. The method of making nanoscale holes in two dimensional $MoS_2$ nanosheets as claimed in claim 1, wherein the nanoscale holes have dimensions below 20 nm.

4. The method of making nanoscale holes in two dimensional $MoS_2$ nanosheets as claimed in claim 1, wherein the reaction between electrosprayed AG+ ions and $MoS_2$ nanosheets makes nanoporous $MoS_2$ nanosheets with Mo-rich edges.

5. The method of making nanoscale holes in two dimensional $MoS_2$ nanosheets as claimed in claim 1, further comprising metal ions including monovalent ions $Ag^+$, $Cu^+$, and divalent ions, $Hg^{2+}$, $Cu^{2+}$, $Zn^{2+}$, $Ni^{2+}$.

6. The method of making nanoscale holes in two dimensional $MoS_2$ nanosheets as claimed in claim 5, further comprising electrospraying the metal ions in water, acetonitrile, methanol, ethanol, dimethyl formamide, tetrahydrofuran, and combination thereof at different proportions.

7. The method of making nanoscale holes in two dimensional $MoS_2$ nanosheets as claimed in claim 1, the two dimensional materials comprising $MoS_2$, $MoSe_2$, $WS_2$, $WSe_2$.

8. The method of making nanoscale holes in two dimensional $MoS_2$ nanosheets as claimed in claim 1, wherein the two dimensional nanosheets are supported on substrates including water, ITO-coated glass, copper, silicon using an adsorption process.

9. The method of making nanoscale holes in two dimensional $MoS_2$ nanosheets as claimed in claim 5, wherein the metal ions are deposited on the nanosheet substrate using nanoelectrospray ionization.

10. The method of making nanoscale holes in two dimensional $MoS_2$ nanosheets as claimed in claim 1, wherein the chemical reaction of $MoS_2$ nanosheets with the metal ions is photocatalytically more active which increases the generation of reactive oxygen species and disinfection efficiency.

11. The method of making nanoscale holes in two dimensional $MoS_2$ nanosheets as claimed in claim 1, wherein the nanoporous $MoS_2$ nanosheets supported on silica or alumina are used as a device for filtration.

12. The method of making nanoscale holes in two dimensional $MoS_2$ nanosheets as claimed in claim 5, wherein the metal ions for chemical etching are supplied as droplets in the gas phase onto the two dimensional nanosheet supported on a substrate.

13. The method of making nanoscale holes in two dimensional $MoS_2$ nanosheets as claimed in claim 5, wherein the metal ions for chemical etching are supplied in solution containing the two dimensional nanosheets.

14. The method of making nanoscale holes in two dimensional $MoS_2$ nanosheets as claimed in claim 1, wherein the nanoporous $MoS_2$ nanosheets act as a membrane for desalination of water.

15. The method of making nanoscale holes in two dimensional $MoS_2$ nanosheets as claimed in claim 1, further comprising using molecular ions to extract sulphur.

* * * * *